Nov. 29, 1949  E. O. ROGGENSTEIN ET AL  2,489,724
RECORDING AND COMPUTING MACHINE
Filed Feb. 12, 1946  9 Sheets-Sheet 2

INVENTORS
E.O. ROGGENSTEIN
E.F. THIERFELDER
BY Anthony Mantione
AGENT

Nov. 29, 1949   E. O. ROGGENSTEIN ET AL   2,489,724
RECORDING AND COMPUTING MACHINE
Filed Feb. 12, 1946

INVENTORS
E. O. ROGGENSTEIN
E. F. THIERFELDER
BY
Anthony Mantione
AGENT

Nov. 29, 1949  E. O. ROGGENSTEIN ET AL  2,489,724
RECORDING AND COMPUTING MACHINE
Filed Feb. 12, 1946  9 Sheets-Sheet 4

INVENTORS
E.O. ROGGENSTEIN
E.F. THIERFELDER
BY
Anthony Mintione
AGENT

Nov. 29, 1949   E. O. ROGGENSTEIN ET AL   2,489,724
RECORDING AND COMPUTING MACHINE
Filed Feb. 12, 1946                               9 Sheets-Sheet 5

INVENTORS
E.O. ROGGENSTEIN
E.F. THIERFELDER
BY
Anthony Mantione
AGENT

Nov. 29, 1949  E. O. ROGGENSTEIN ET AL  2,489,724
RECORDING AND COMPUTING MACHINE
Filed Feb. 12, 1946  9 Sheets-Sheet 6

INVENTORS
E. O. ROGGENSTEIN
E. F. THIERFELDER
BY Anthony Mantione
AGENT

Nov. 29, 1949 E. O. ROGGENSTEIN ET AL 2,489,724
RECORDING AND COMPUTING MACHINE
Filed Feb. 12, 1946 9 Sheets-Sheet 7
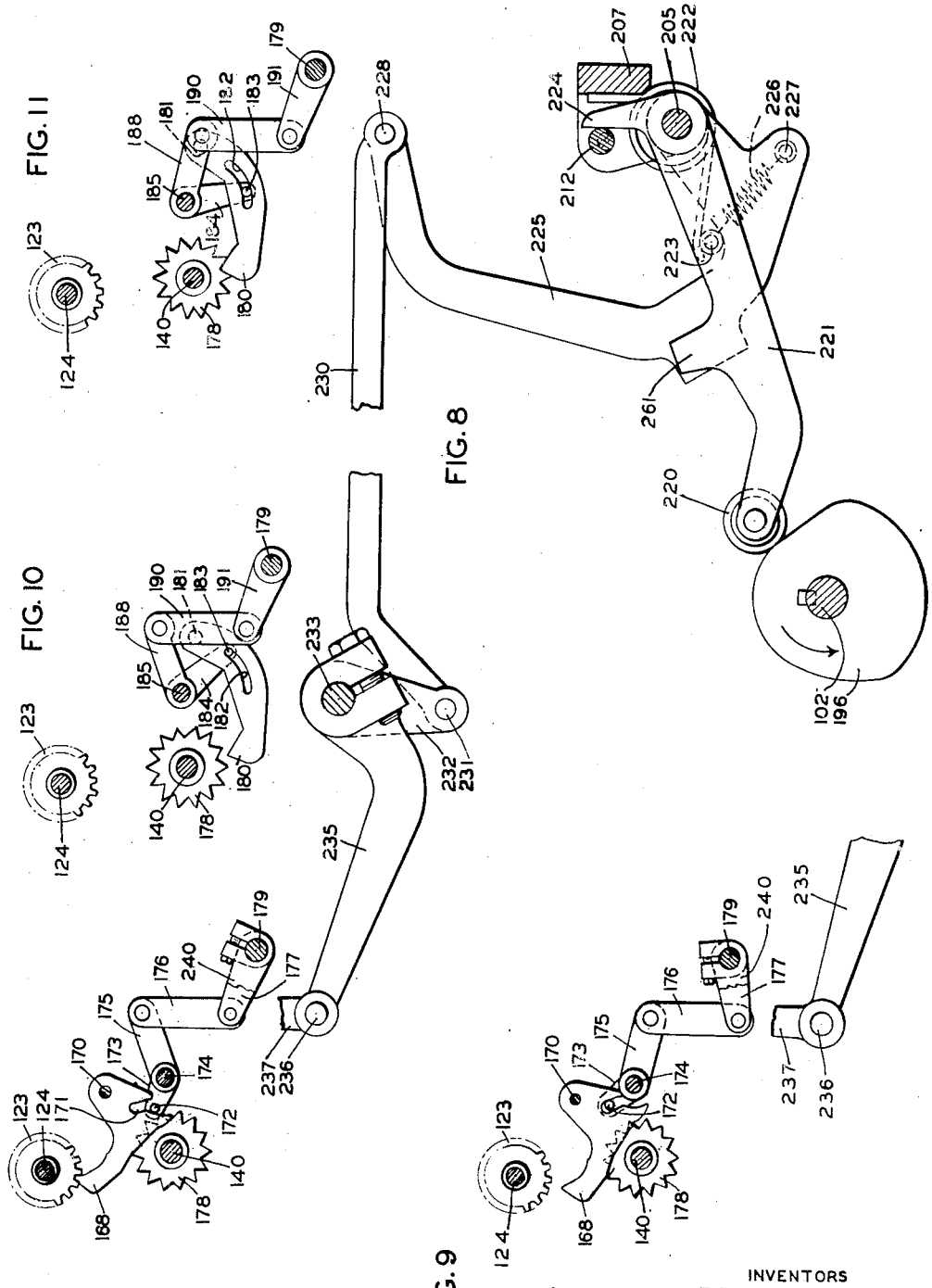
INVENTORS
E O ROGGENSTEIN
E.F. THIERFELDER
BY
Anthony Mantione
AGENT Nov. 29, 1949  E. O. ROGGENSTEIN ET AL  2,489,724
RECORDING AND COMPUTING MACHINE
Filed Feb. 12, 1946
9 Sheets-Sheet 8
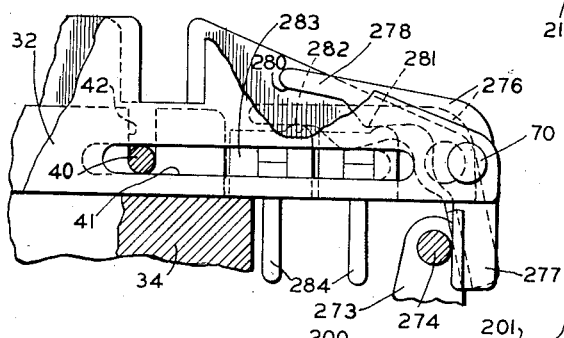
FIG. 17
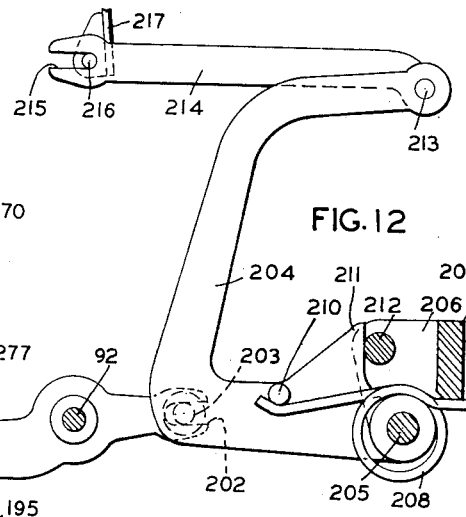
FIG. 12
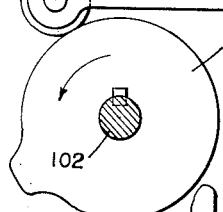
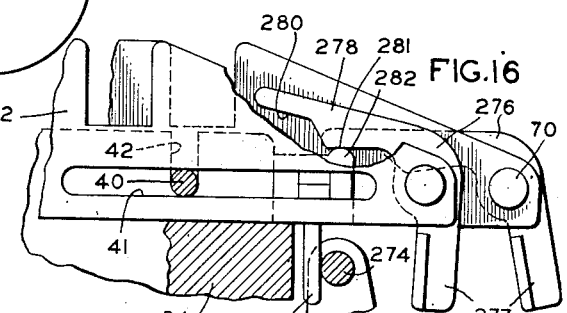
FIG. 16
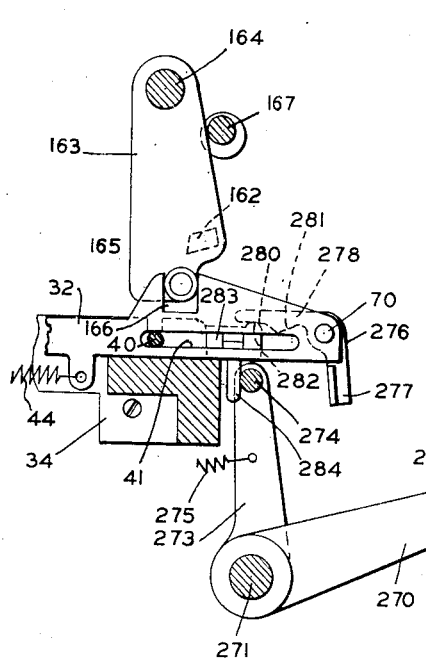
FIG. 13
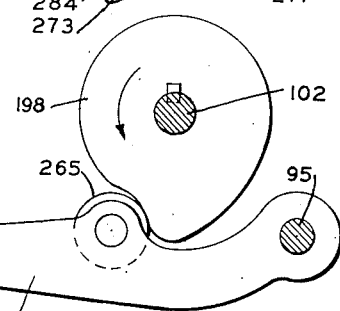
INVENTORS
E. O. ROGGENSTEIN
E. F. THIERFELDER
BY
Anthony Mantione
AGENT Nov. 29, 1949 E. O. ROGGENSTEIN ET AL 2,489,724
RECORDING AND COMPUTING MACHINE
Filed Feb. 12, 1946
9 Sheets-Sheet 9

INVENTORS
E.O. ROGGENSTEIN
E.F. THIERFELDER
BY
Anthony Mantione
AGENT

Patented Nov. 29, 1949

2,489,724

UNITED STATES PATENT OFFICE 2,489,724

RECORDING AND COMPUTING MACHINE

Edwin O. Roggenstein and Emil F. Thierfelder, Ilion, N. Y., assignors to Remington Rand Inc., Buffalo, N. Y., a corporation of Delaware Application February 12, 1946, Serial No. 647,134

26 Claims. (Cl. 235—59)

This invention relates to recording and computing machines and more particularly to accumulator actuator mechanisms and features associated therewith.

Heretofore, recording and computing machines such as the Remington type disclosed herein employed actuator mechanisms of the form shown and described in U. S. patent to Wahl 1,270,471, issued June 25, 1918. This form of actuator mechanism is operable under control of numeral keys which, when depressed, actuate intricate and costly linkages including the well known "goose necks" which in turn actuate the usual "sector gear." Each time an entry is made this "sector gear" is adapted to move into and out of mesh with a train of gears increasing the possibility of error.

In addition to the above intricate and costly actuator mechanism, the above type of recording and computing machine employs a front cam shaft such as is disclosed in U. S. patent to Hart 2,063,737, issued December 8, 1936. This front cam shaft has mounted thereon a cam for each numeral key, ten in number, and a one revolution clutch mechanism for each cam. Upon depression of a numeral key, its corresponding clutch mechanism is released to effect the rotation of its associated cam for one complete revolution thereby causing the entering of the amount in the accumulator and printing said amount. It will be seen that the cost of manufacturing and servicing this type of cam shaft assembly and its allied mechanisms is considerable.

Therefore, the principal object of the present invention is to simplify the construction of the above type of recording and computing machine, to greatly improve the operation of said machine and, moreover, to reduce the cost of its manufacture.

Another object of this invention is to simplify and improve the actuator mechanism in a manner to more simply and accurately enter amounts in the accumulator.

Still another object of this invention is to improve the accuracy of the actuator mechanism by retaining the actuator gear train in mesh at all times.

Still another object of this invention is to eliminate the use of separate and distinct power drive mechanisms for each numeral key.

Another object is to enable operation of the actuator mechanism, printing mechanism, escapement mechanism, and the restoring mechanism of the machine by the use of a single power drive clutch mechanism effective upon the operation of any one of the numeral keys.

In carrying out the above objects, the present invention provides a single cam unit consisting of four cams which, upon depression of any numeral key, are effective to control various machine functions namely, entering of the amount corresponding to the numeral key depressed, conditioning the actuator mechanism whereby an amount may be entered only during a predetermined part in the machine cycle, spacing the carriage, and restoring the various mechanisms to normal position. The entering or add cam is operable to control the operation of an epicyclic gear train which includes a sun gear, a planet gear, an internal gear, and an external gear which is in continuous driving connection with the usual master wheel. The locking cam controls the movement of locking and unlocking means associated with the sun gear and master wheel in a manner to first unlock the master wheel and lock the sun gear during the amount entering part of the cycle in order to permit the epicyclic gear train to rotate the master wheel an amount corresponding to the numeral key depressed and, second, to lock the master wheel and unlock the sun gear during the restoring part of the cycle to permit the sun and planet gears to return to normal position without effecting movement of the internal and external gears and the master wheel. The space cam is operable to control the escapement of the carriage to the next step for the next entering cycle of the machine. The restoring cam is operable to restore the various mechanisms actuated upon the movement of any numeral key.

Other objects and structural details of the present invention will be apparent from the following description when read in connection with the accompanying drawings wherein.

Figures 2, 6:
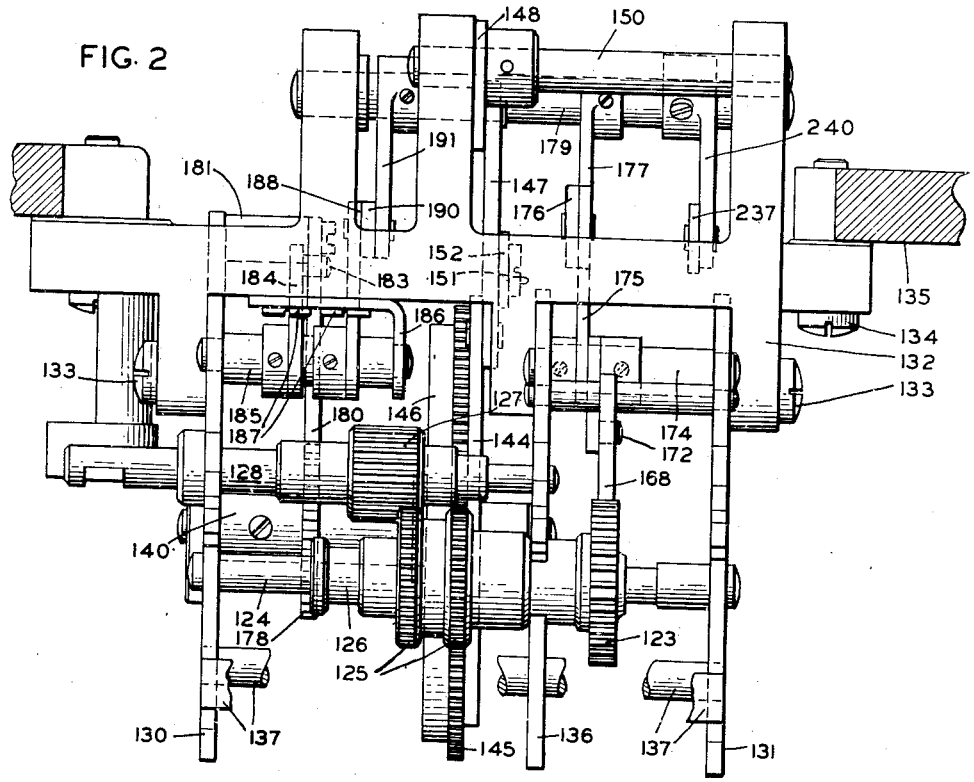
Fig. 2 is a partial top plan view of the actuator mechanism.
Figure 4:
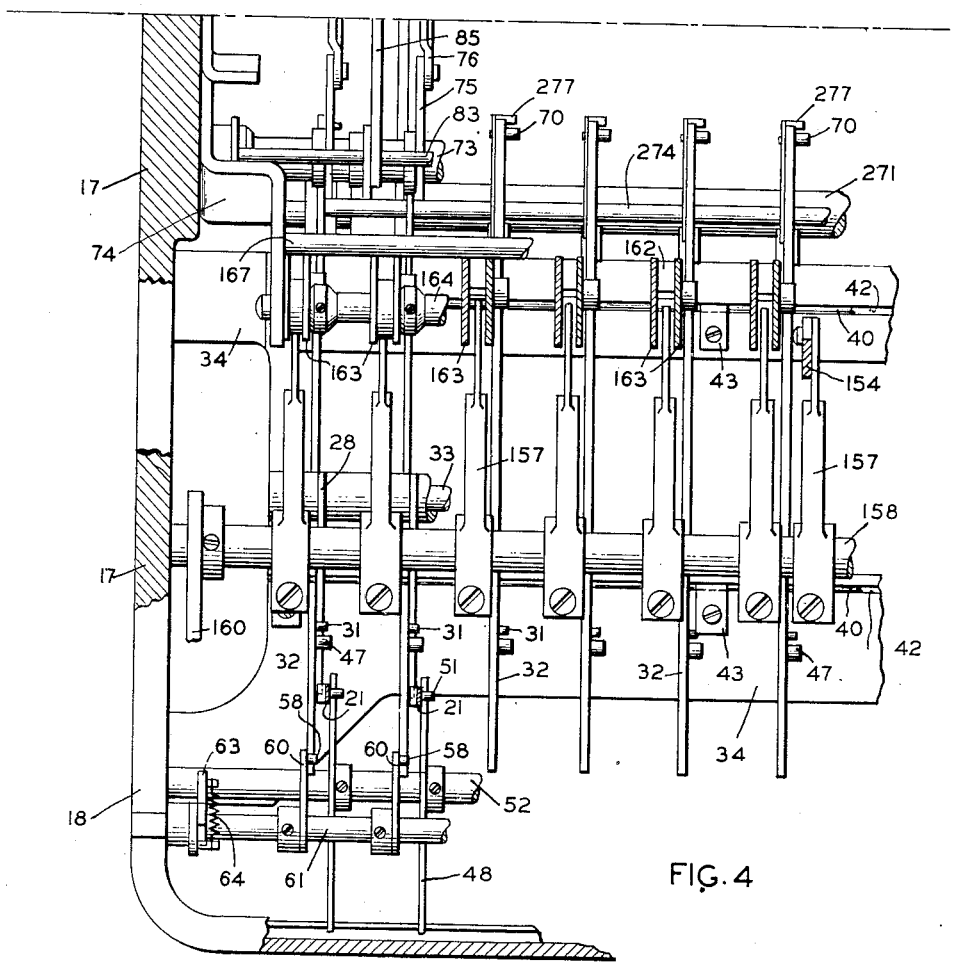
Figure 5:
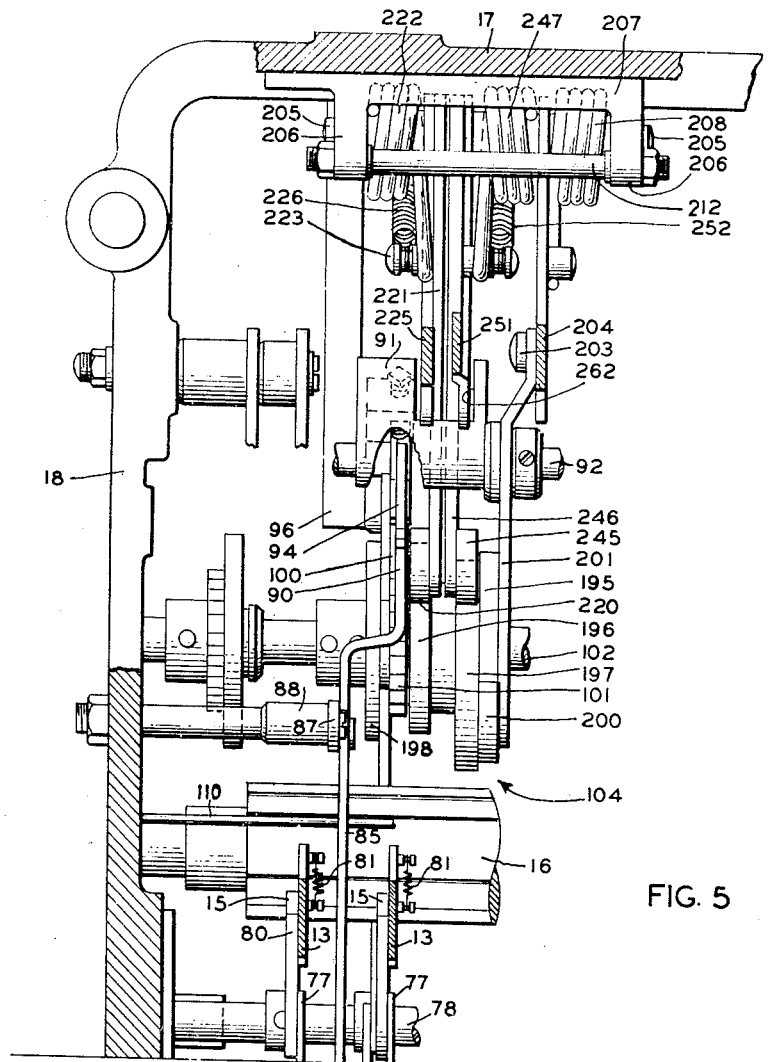
Figure 7:
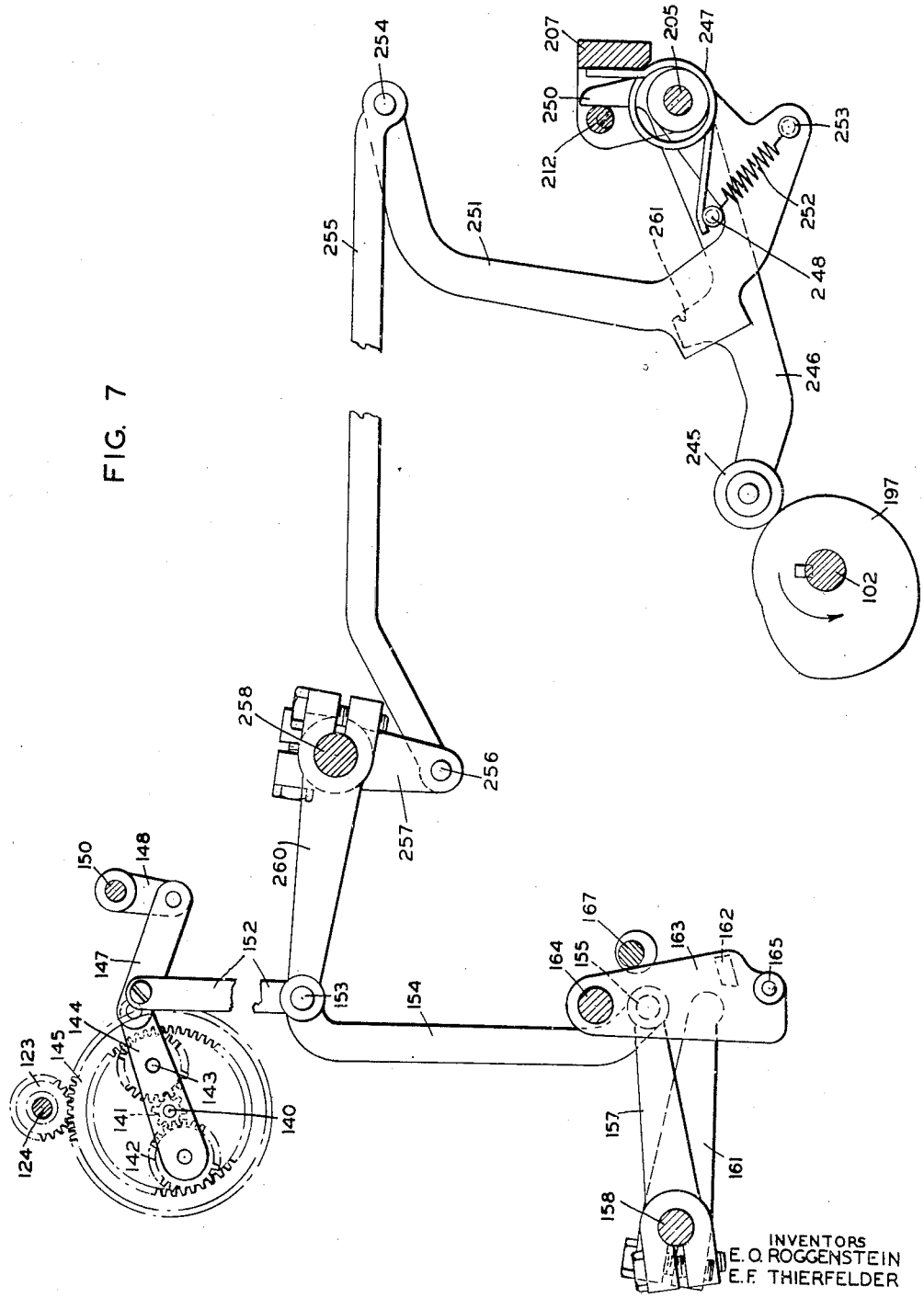
Figure 14:
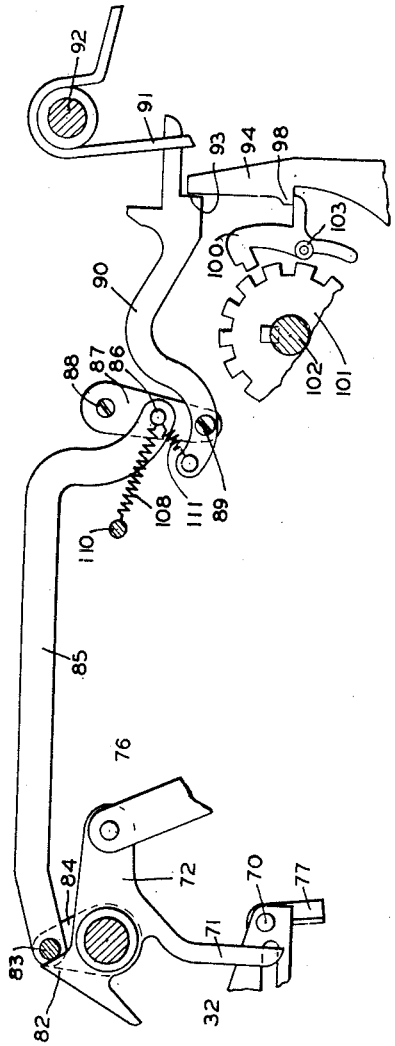
Figure 15:
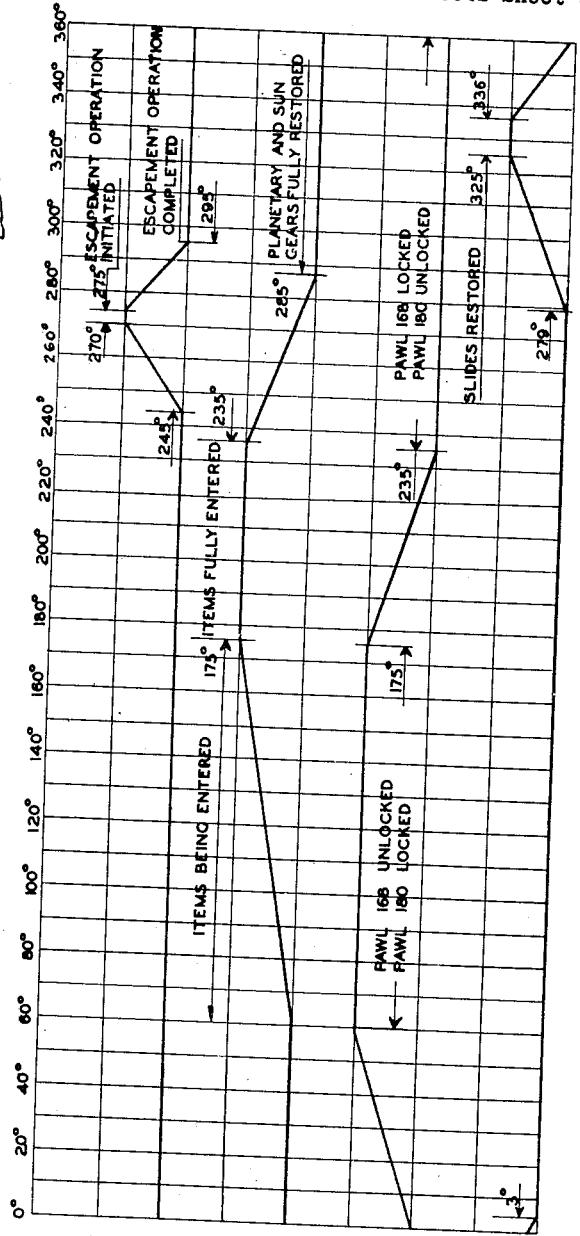

Figs. 4 and 5, when taken together represent a front to rear top partial plan view of the power base portion of the machine disclosing the cam unit and its associated mechanism;

Fig. 6 is an exploded isometric view of parts of the key controlled slides and their associated differential limiting members;

Fig. 7 is a diagrammatic view of the entering or add cam and its associated mechanism in normal position;

Fig. 8 is a diagrammatic view of the locking and unlocking cam and its associated mechanism in normal position;

Fig. 9 is a partial view similar to Fig. 8 disclosing the locking and unlocking master gear pawl in its operated position;

Fig. 10 is a detail view disclosing the mechanism associated with the sun gear locking pawl in normal position;

Fig. 11 is a detail view similar to Fig. 10 but in operated position;

Fig. 12 is a diagrammatic view disclosing the space cam and its associated mechanism in normal position;

Fig. 13 is a diagrammatic view disclosing the restoring cam and its associated mechanism in normal position;

Fig. 14 is a diagrammatic view disclosing the mechanism for releasing the clutch dog latch associated with the cam unit;

Fig. 15 is a timing chart;

Fig. 16 is an enlarged detail view of a portion of the actuating slides with one of the slides in actuated position;

Fig. 17 is a view similar to Fig. 16 with the actuated slide moved to a position beyond its normal latched position.

The invention described herein is shown embodied in a recording and computing machine of the type shown and described in the above mentioned Patent No. 2,063,737. However, while the invention is herein embodied in the above type of machine, it will be understood that the same may be used in connection with any type of recording and computing machine without departing from the scope of the invention. Only so much of the old machine is herein shown and described as is consistent with a clear understanding of the invention.

*General machine*

Figure 1:
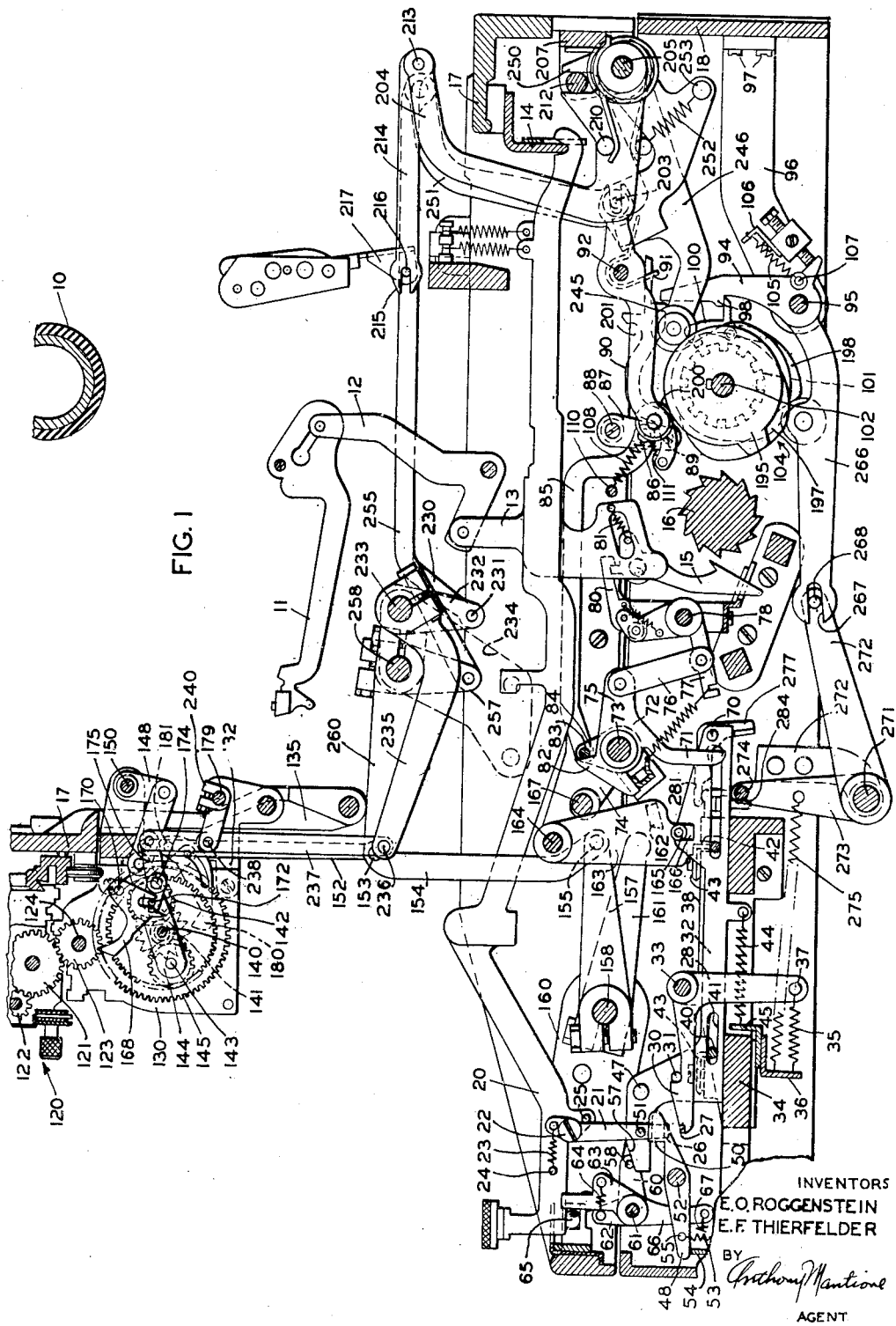
Fig. 1 is a front to rear vertical cross section through the machine with certain parts removed.

Referring particularly to Fig. 1, the present machine includes a platen 10, type bars 11, sub levers 12 connected to levers 13 which are pivoted on one end on a channel bracket 14 and at the other end are provided with pivoted depending snatch pawls 15 adapted to be swung into engagement with the usual power driven snatch roll 16. When the snatch pawl 15 is released to engage the snatch roll 16 in a manner to be described, its associated type bar 11 is actuated to print either alphabet or numeral letters in accordance with the particular key depressed. The typewriter mechanism is mounted in a frame 17 which is pivoted at the rear of the machine in the usual manner to a lower power base frame 18.

*Key operation of power shaft*

As is best seen in Figs. 1, 4, and 5, each of the numeral key levers 20 are pivoted at their rear ends on channel bracket 14 and are provided at their forward ends with depending levers 21. The levers 21 are pivoted at 22 and are urged in a counter-clockwise direction by a spring 23, one end of which is connected to the lever 21 and the other end connected to a pin 24 on the numeral lever 20. A pin 25 on the lever 20 limits the counter-clockwise movement of its associated lever 21. The extreme lower portion of each of the levers 21 are provided with a bent over lug 26 which lies in the same vertical plane as a shoulder 27 formed upon the forward end of an associated lever 28. Each lever 28 is formed with an additional shoulder 30 adapted to be engaged by a pin 31 mounted upon an associated slide 32 so as to limit the forward movement of said slide. The levers 28 are rotatably mounted in suitable space relation upon a cross shaft 33 mounted at its ends in a casting 34, secured to the inner sides of the left and right hand walls of the power base frame 18. Individual springs 35 having one end connected to a plate 36 secured to the casting 34 and the other end connected to pins 37 on the levers 28 serve to urge the levers in a clockwise direction. The slides 32 are guided for front to rear movement in slots 38 formed on the casting 34 and are limited in such front to rear movement by means of a pair of cross rods 40 which pass through elongated slots 41 in the slides 32. In order that the cross rods 40 may be held against any displacement, the rods fit into notches 42 formed in the comb portion of casting 34 and are clamped in said notches by means of suitable clamps 43 secured to the upper portion of casting 34. Each of the slides 32 are resiliently urged forwardly by means of a spring 44 having one end connected to a plate 45 secured to the casting 34 and the other end connected to the slide 32. The above construction is such that upon depression of a numeral key 20, the bent over portion 26 of its associated lever 21 engages the shoulder 27 of its associated lever 28 to rock said lever about its pivot 33 against the tension of spring 35. When the lever 28 is thus rocked its shoulder 30 moves out of the path of the pin 31 of its associated slide 32 to permit said slide to move forwardly due to the tension of its spring 44. The above slides 32 are adapted to move forwardly to their effective position and rearwardly to the restored position once for each cycle of the machine to control the various machine functions.

In order to effect an immediate full restoration of the lever 28 so as to be in position to latch its associated slide when said slide is restored to its normal rearward position, the forward end of the slide is provided with a pin 47 which is adapted to engage and move its associated lever 21, in a clockwise direction against the tension of its spring 23, out of the path of shoulder 27. This action takes place at about the time the numeral lever 20 is in its full depressed position. It will be seen from the above that the key lever 20 may be retained in its lowered position a length of time somewhat beyond that which is necessary to release its associated slide while permitting its associated lever 28 to be restored to its latching position.

It is possible that, before the complete restoration of the slide 32 to its fully latched position is effected, the operator may accidently again depress the numeral key 20 thereby rocking its associated lever 28 out of the path of latch pin 31, causing the slide to again move forwardly to start a repeat operation of the machine. In order to avoid this, the present machine is provided with a plurality of latch levers 48 each having a shouldered portion 50 adapted to engage an associated pin 51 on the lever 21. All of the levers 48 are pivoted on a cross shaft 52 secured at its ends to the left and right side walls of the power base frame 18 and are resiliently urged in a counter-clockwise direction by means of individual springs 53 one end of which are connected to a cross plate 54, suitably secured to the front wall of the power base frame 18, and the other end connected to pins 55 on levers 48. The levers 48 are limited in their counter-clockwise movement by the cross plate 54.

The above construction is such that upon depression of a numeral lever 20 the pin 51 on lever 21 engages and moves its associated lever 48 in a clockwise direction against the tension of its spring 53. When the slide 32 is released, in the manner described above, its pin 47 will engage and move its associated lever 21 in a clockwise direction thereby moving its pin 51 out of contact with the upper edge of the rearward end of its associated lever 48. This causes the lever 48 to rock slightly counter-clockwise, due to the tension of its spring 53, until its shoulder 50 engages the pin 51 preventing the lever 21 from returning to its normal upright position. It will be seen that during the time the lever 21 is thus latched, operation of the key lever 20 will not effect movement of its associated lever 28 and a repeat forward movement of its slide 32 is thereby prevented. The pin 51 is not disengaged from shoulder 50 until slightly prior to the full restoration of the numeral lever 20 at which time the lever 21 is rocked to its normal upright position due to the tension of its spring 23.

In order to prevent a second key lever from being operated before the first is fuly restored to its normal position, the forward end of each of the slides 32 is provided with a cam portion 57. Cooperating with the cam portion 57 is a pin 58 mounted upon an arm 60 secured to a cross shaft 61 suitably journaled at its ends in the left and right side walls of the power base frame 18. Also secured to the shaft 61 and located near its left end thereof is a two arm lever, the upright arm 62 of which is resiliently connected to another arm 63 by means of a spring 64 having one end connected to a pin on the arm 62 and the other end connected to a pin on the arm 63. The arm 63 is loosely mounted on shaft 61 and has the upper portion thereof directly in line with the lock balls 65 of the usual ball lock mechanism employed in the present type of machine. The other arm 66 of the two arm lever has connected at its lower portion one end of a spring 67 the other end of which is suitably connected to front frame wall of the power base frame 18. The above construction is such that when a slide 32 moves forwardly upon operation of its corresponding numeral key 20, the cam surface 57 acts to rotate the arm 62 in a counter-clockwise direction and through the spring 64 draws the upper portion of arm 63 to a position between two of the balls 65 to prevent the operation of another key in the usual manner.

In order to effect the rotation of the cam unit, to perform the various functions of the machine, the rearward end of each of the slides 32 is provided with a stud 70 which, when the slide moves forward as above described, engages a depending arm 71 of a four-arm lever 72 loosely mounted on a cross shaft 73 journaled at its ends in brackets 74 (one shown) secured to the inner sides of the left and right hand walls of the power base frame 18. Another arm 75 of the lever 72 has connected thereto one end of a link 76 which link is connected at its other end to one arm of a lever 77 pivoted on a cross shaft 78 which is secured at its ends in brackets 74. Pivoted to the other arm of lever 77 is a hook 80 adapted to normally engage and retain the snatch pawls 15 out of engagement with the snatch roll 16 against the tension of spring 81. When the four-arm lever 72 is rocked clockwise as above described, the lever 77 through link 76 is rocked in a counter-clockwise direction drawing its hook 80 forwardly to move its associated snatch pawl 15 into engagement with the snatch roll 16 in the usual manner. The engagement and disengagement of the snatch pawl 15 with the snatch roll 16 is old and well known and it is not deemed necessary to describe this mechanism further herein.

The lever 72 is provided with another arm 82 which when the lever 72 is rocked, as above described, engages a bail rod 83 supported at its ends by arms 84 (one shown) loosely mounted upon the shaft 73. Suitably connected at its forward end to the bail 83 (see also Figs. 4, 5, and 14) is a rearwardly extending link 85 the rear end of which is connected at 86 to a depending arm 87 pivotally mounted upon a stub shaft 88 secured to the left hand wall of the frame 17. Connected at 89 to the depending arm 87 is a lever 90, one arm of which extends rearwardly and is supported and guided for sliding movement in a slot formed in a comb plate 91 which plate is rigidly supported upon a cross shaft 92 suitably mounted in the left and right hand frame walls of the typewriter frame 17. The lever 90 is provided with a shoulder 93 adapted when the lever 90 is moved rearwardly to engage the upper end of a latch member 94 and rock said member about its pivot 95 which pivot is secured to a forwardly extending bracket 96 secured to the rear wall of the power base frame 18 by screws 97. The latch member 94 is provided with a shoulder 98 which normally engages and retains a clutch dog 100 out of engagement with the tooth of a clutch member 101 suitably secured to a continuously rotating power shaft 102 journaled at its ends in the left and right hand frame walls of the power base frame 18. The clutch dog 100 is resiliently urged in a counter-clockwise direction in the usual manner to engage with a tooth on clutch member 101 and is pivoted upon a stud 103 suitably secured to a cam unit 104 (see Fig. 1) loosely mounted upon the shaft 102. A spring 105 having one end connected to a bracket 106 suitably fixed to the bracket 96 and the other end connected to a pin 107 on the latch member 94 serves to urge the latch member 94 in a counter-clockwise direction.

From the above it will be seen that normally the latch member 94 through its shoulder 98 retains the clutch dog 100 out of engagement with the teeth on the clutch member 101, thereby disconnecting the cam unit 104 from the continuously rotating shaft 102. Upon depression of a numeral key, the link 90 is moved rearwardly as above described to disengage the latch member 94 and the clutch dog 100 whereby the clutch dog moves into engagement with a tooth on the clutch member 101 to connect the cam unit 104 with the continuously rotating shaft 102.

Near the end of the cycle of operation, the link 90 is brought forward to its normal position whereby the latch member 94 through its spring 105 is rocked to its counter-clockwise position in the path of the clutch dog 100 to disengage the clutch member 101. A spring 108 having one end connected to the arm 87 and the other end connected to a cross shaft 110 serves to restore the arm 87 and its associated linkage to their forward normal position. A spring 111 having one end connected to the arm 87 and the other end connected to the forward arm of lever 99 serves to urge the rearward end of said lever downwardly into operating relationship with the upper portion of the latch member 94.

*Totalizer and actuator mechanism*

Figure 3:
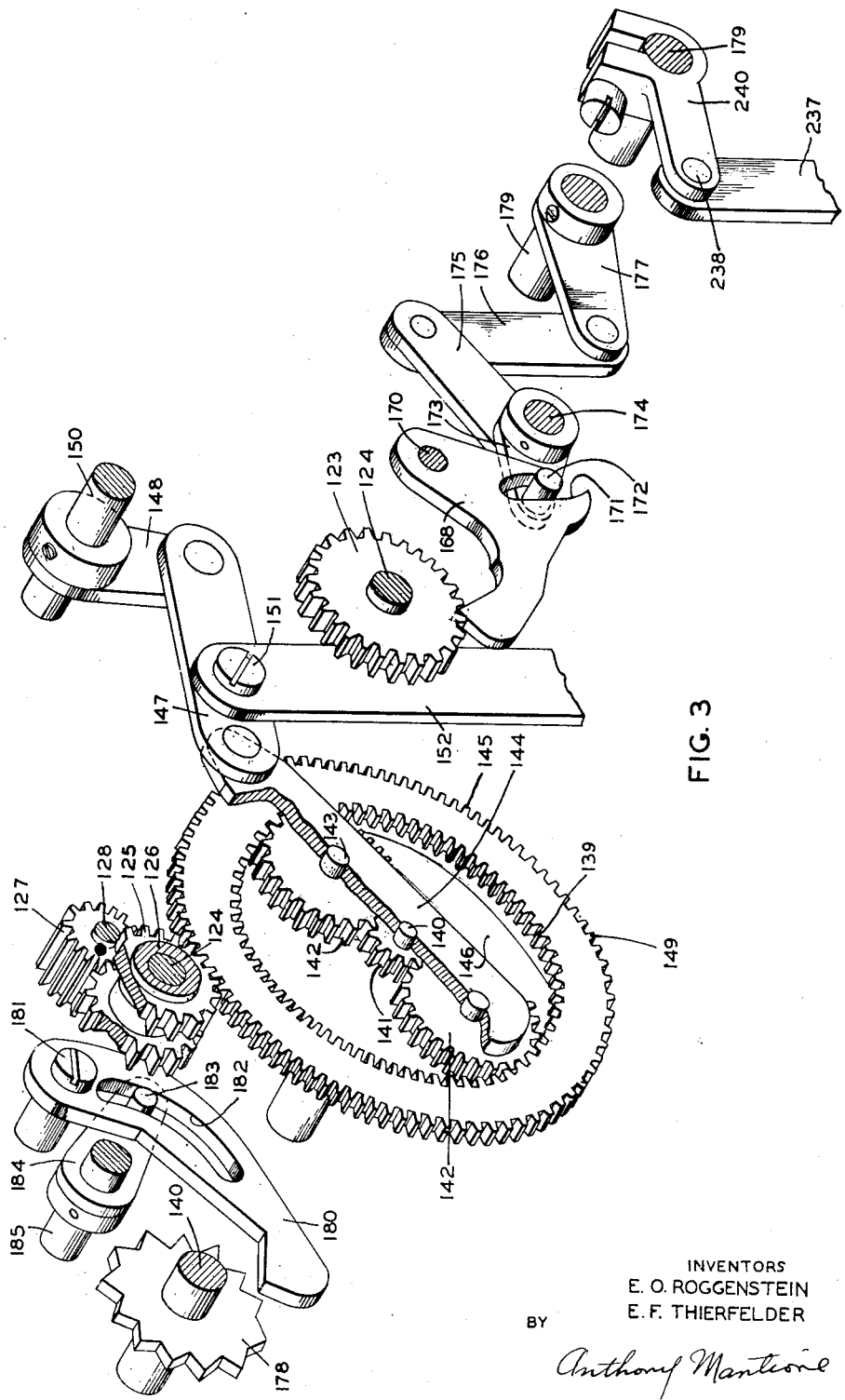
Fig. 3 is an exploded isometric view disclosing the epicyclic gear train and the control pawls therefor.

Referring particularly to Figs. 1, 2 and 3, the typewriter frame 17 supports a carriage upon which is mounted in the usual manner, a totalizer, generally designated by the reference numeral 120, of the type shown and described in the above mentioned patent to Wahl 1,270,471. This totalizer has carry gears 121 which through pinions 122 rotate dial wheels (not shown) a distance corresponding to the number entered. There are a set of these gears and pinions for each denomination of the totalizer. As is well known in the art, the totalizer moves step by step with the carriage so as to bring the carry gears 121 successively into engagement with the usual master gear 123. The master gear 123 is secured to a shaft 124 and is suitably clutched in the well known manner to a pair of gears 125 secured to a sleeve 126 which is mounted for sliding movement upon the shaft 124. The gears 125 are associated with the usual credit balance reversing mechanism including a pinion 127 secured to a reversing shaft 128 which slides longitudinally back and forth under the influence of the credit balance key or other means not shown. In one position of these elements the shaft 128 is disposed in a manner to drive the master gear 123 in one direction and when the shaft 128 is moved to another position it will cause a reverse rotation of the master gear 123. This operation is well known and described in the above mentioned Patent 1,270,471 and need not be further described herein except to state that, in the above mentioned patent, a sector gear may be brought into engagement with either the pinion 127 or one of the gears 125 to drive the master gear 123 either in one direction or another in accordance with the position of the credit balance reversing mechanism.

In the present invention, the above mentioned sector gear and associated mechanism as employed in the Patent 1,270,471 is replaced by an annular epicyclic gear train which is continuously in mesh either with one of the gears 125 upon addition, or with the pinion 127 upon subtraction. This epicyclic gear train is operable by a novel actuating mechanism which is under control of the cam unit 104 to effect rotation of the master gear 123 in either direction a certain distance in accordance with the particular numeral key depressed. The above gear train is mounted upon and located within left and right hand frame walls 130 and 131 respectively, which frame walls are secured to an upright casting 132 by screws 133. The casting 132 is secured by screws 134 to an upright casting 135 secured to the typewriter frame 17. Located between the two frame walls 130 and 131 is a third frame wall 136 formed integral with the frame walls 130 and 131 by means of tie-rods 137. It will be seen that the frame walls 130, 131 and 136 and the casting 132 form a unitary integral structure which can be easily removed from the machine for repairs or replacement when necessary.

Referring particularly to Figs. 1, 2, and 3, the epicyclic gear train includes a cross shaft 140 journaled at its ends in frame walls 130 and 136 and has securely mounted thereon a sun gear 141 which is continuously in mesh with a pair of planetary gears 142. The planetary gears 142 are mounted for rotation upon stub shafts 143 secured to an arm 144 which is mounted for rotation upon the shaft 140 and are continuously in mesh with the teeth 139 of an internal gear 145. The internal gear 145 has teeth 149 formed at its periphery thereof which are adapted to be in mesh with either one of the gears 125 or pinion 127 and is suitably secured to a concentric disk 146 loosely mounted upon the shaft 140. The above construction is such that if the sun gear 141 is locked against rotation in a manner later to be described and the arm 144 is rocked in a clockwise direction, the planet gears 142 will revolve epicyclically around the sun gear 141 to effect a clockwise rotation of the internal gear 145 so as to enter amounts additively or subtractively into the accumulator as the case may be. Now, if during the return or counter-clockwise movement of the arm 144, the master gear 123 is locked against rotation in a manner later to be described and the sun gear is not locked, the internal gear being so locked will cause the planetary gears 142 to return back to normal position and idly rotate the sun gear 141 and its shaft 140.

The arm 144 is adapted to be reciprocated downwardly and upwardly once during each cycle of the machine and is connected to the forward end of a link 147 which in turn is connected at its rearward end to a depending arm 148. The arm 148 is secured to a shaft 150 journaled at its ends in rearward extensions of the casting 132. Loosely connected at 151 to the link 147 is an upright link 152 adapted, by means later to be described, to be reciprocated upwardly and downwardly once in each cycle of the machine. It will be noted at this time that items may be entered into the accumulator only during the downward movement of the link 152.

In order to limit the downward movement of the link 152 so that an amount may be entered in the accumulator corresponding to the particular key depressed, the lower end of the link 152 is connected at 153 to another link 154 (see also Fig. 7) which in turn is connected at 155 to a rearwardly extending arm 157 (see also Fig. 4) suitably secured to a cross shaft 158. The cross shaft 158 is journaled at its ends in left and right hand brackets 160 (only one shown) secured to the inner sides of the left and right hand walls of the typewriter frame 17 and has securely mounted thereon a plurality of differential arms 161, ten in number, corresponding to the ten numeral keys 20. The rearward ends of each of these arms 161 are adapted to cooperate with an associated stop block 162 securely supported between a pair of depending arms 163 integral with each other and pivotally supported upon a cross shaft 164 secured at its ends in brackets 74. The lower ends of one of each pair of the depending arms 163 is provided with a stud 165 adapted to engage a slot 166 formed in its associated slide 32. An eccentric cross rod 167 common to all of the depending arms 163 is adjustably secured at its ends to the brackets 74 and serves to limit the counter-clockwise movement of the arms 163 when the typewriter frame 17 is swung away from the base frame 18. This eccentric rod 167 serves also to maintain an alignment between the arms 163 and their corresponding slides 32 so that the studs 165 on the arms may properly enter their respective slots 166 when the frame 17 is swung to the closed operating position. The above construction is such that upon operation of a numeral key 20 its associated slide 32 moves forward, as above described, to rock its corresponding pair of depending arms 163 in a clockwise direction thereby bringing the stop block 162 thereon directly beneath and in vertical alignment with its associated differential arm 161. When, during the beginning of a machine cycle, the links 152 and 154 are moved downwardly, in a manner later to be described, the shaft 159 is rocked clockwise to move all of the differential arms 161 downwardly, until one of these arms limits against its corresponding stop block 162. This downward movement of the above linkage will cause a clockwise rotation of the arm 144 which, through the planetary gears 142 and the sun gear 141, at this time locked, will cause clockwise rotation of the internal gear 145 to effect rotation of either one of the gears 125 or pinion 127 a distance corresponding to the distance travelled by the differential arms 161. When, during the latter part of the machine cycle, the links 152 and 154 are moved upwardly, as will hereinafter be described, the arm 144 is rocked in a counter-clockwise direction. However, at this time the sun gear 141 is free to rotate and the master and internal gears 123 and 145 respectively are locked against rotation whereby the planetary gears 142 and the sun gear 141 will move idly to their normal position.

In order to effect the above mentioned clockwise rotation only of the internal gear 145 during the reciprocatory vertical motion of the arm 144, locking and unlocking means are provided herein for locking the sun gear 141 and unlocking the master gear 123 during the start of a machine cycle and locking the master gear 123 and unlocking the sun gear 141 during the latter or restoring part of the machine cycle.

Referring to Figs. 1, 2 and 3, the means for locking and unlocking the master gear 123 includes a pawl 168 pivotally mounted upon a shaft 170 journaled at its ends in frame plates 131 and 136. The pawl 168 is normally in locked engagement with the master gear 123 and is provided with a cam slot 171 (see also Figs. 8 and 9) within which rides a pin 172 fixed to a forwardly extending arm 173 secured to a shaft 174. The shaft 174 is journaled at its ends in frame plates 131 and 136 and has secured thereon a rearwardly extending arm 175 which is connected by means of a link 176 to another arm 177 which in turn is secured to a shaft 179 journaled at its ends in the rearward extensions of the casting 132. As will hereinafter be described, the shaft 179 is given a reciprocatory movement first in a counter-clockwise direction and then in a clockwise direction once for each machine cycle. The above construction is such that when the shaft 179 is rocked counter-clockwise, the shaft 174 and consequently the arm 173 are rocked clockwise in a manner to rock the pawl 168 by means of the pin and slot connection 171 and 172, out of engagement with the teeth on the master gear 123.

The sun gear 141 may be locked and unlocked by means including a lock gear 178 (see also Figs. 10 and 11) secured to the shaft 140 upon which is also secured the sun gear 141 as above described. Cooperating with the lock gear 178 is a pawl 180 pivoted upon a short stub shaft 181 secured to the left hand frame wall 130. The pawl 180 is provided with a cam slot 182 within which rides a pin 183 secured to an arm 184 fixed to a shaft 185. The shaft 185 is journaled at its left hand end in the left hand frame wall 130 and at its right end in a depending bracket 186 secured by means of screws 187 to the casting 132. The means for rocking the shaft 185 and the arm 184 so as to move the pawl 180 into and out of engagement with the lock gear 178 is substantially the same as that previously described in connection with the pawl 168. Referring particularly to Figs. 2 and 10, the shaft 185 has securely mounted thereon a rearwardly extending arm 188 which is connected by means of link 190 to another arm 191 secured to the previously described shaft 179. The above construction is such that when the shaft 179 is rocked counter-clockwise during the first part of the machine cycle, the shaft 185 and consequently the arm 184 are rocked in a clockwise direction whereby the pin 183 cooperating with the cam slot 182 moves the pawl 180 into engagement with the teeth on lock gear 178, thereby locking the sun gear 141 against rotation. When the shaft 179 is rocked clockwise during the latter part of the cycle, the shaft 185 and arm 184 are rocked in a counter-clockwise direction moving the pawl 180 out of engagement with the lock gear 178 rendering the sun gear 141 free to rotate. It will be noted that the construction of the above pawls 168 and 180 is such that, during the entering part of the cycle, the pawl 180 is always moved into engagement with the gear 178 slightly before the pawl 168 unlocks the gear 123 and, during the restoring part of the cycle, the pawl 168 always locks the gear 123 slightly before the pawl 180 unlocks the gear 178.

*Cam unit*

Referring to Figs. 1 and 5 the cam unit which may be brought into and out of engagement with the power shaft 192, as above described, consists of four cams suitably formed integral with each other. These four cams are the escapement or spacing cam 195 (see also Fig. 12), the locking and unlocking cam 196 (see also Figs. 8 and 10), the entering or add cam 197 (see also Fig. 7) and the restoring cam 198 (see also Fig. 13). The operation of these cams and their associated mechanisms will be separately described hereinafter.

*Escapement cam mechanism*

Referring particularly to Figs. 1, 5, and 12, the escapement or spacing mechanism is under control of its associated spacing cam 195 and includes a roller 200 adapted to ride upon the periphery of said cam. The roller 200 is rotatably mounted upon the forward portion of one arm of a lever 201 pivoted upon the cross shaft 92 which shaft is supported at its ends in the left and right hand walls of the typewriter frame 17. The rearward portion of the other arm of the lever 201 is forked at 202 to embrace a pin 203 mounted upon an upwardly extending U-shaped arm 204. The lower portion of the arm 204 is loosely mounted upon a shaft 205 secured at its ends in left and right hand extensions 206 formed in a bracket 207 suitably secured to the innerside of the rear wall of frame 17. A spring 208, one end of which bears against the lower side of bracket 207 and the other end of which bears against a pin 210 on the arm 204 serves to urge the arm 204 in a clockwise direction and consequently the roller 200 against the periphery of cam 195. An eccentric cross bar 212 adjustably secured to the left and right hand extensions 206 cooperates with a shoulder 211 on the arm 204 in a manner to limit the clockwise movement of said arm. The upper end of the arm 204 has loosely connected at 213 a forwardly extending link 214, the forward end of which is forked at 215 to receive a pin 216 mounted on the lower portion of the well known escapement rocker element 217. The above construction is such that normally the roller 200 on the lever 201 rides upon the low dwell of the cam 195 whereby the arm 204 is in its full clockwise postion. When the cam unit 104 is clutched to the continuously rotating power shaft 192, upon depression of a numeral key 20 as above described, the cam unit including cam 195 is rotated in a counter-clockwise direction.

Referring particularly to Figs. 12 and 15, at about 245° rotation of the cam 195, the roller 200 cooperating therewith begins to rise from the low dwell of the cam, and through lever 201, pin 203 and the forked portion 202 begins to rock the arm 204 about its pivot 205 against the tension of its spring 208. This causes forward movement of the upper end of the arm 204 thereby moving the link 214 in a substantially horizontal direction whereby through the pin 216 and the forked portion 215, the rocker element 217 is rocked to initiate an escapement operation of the machine in the well known manner. At about 270° rotation of the cam 195 the roller 200 begins to ride upon the high dwell of the cam at which time the arm 204 through the lever 201 is at its full counter-clockwise position and the escapement rocker element 217 through the link 214 is at its fully operated position. At about 275° rotation of the cam 195 the roller 200 thereon begins to ride off the high dwell of the cam thereby beginning to restore the lever 201, the arm 204, the link 214, and the rocker element 217 to normal position. At about 295° rotation of the cam 195 the lever 200 thereon begins to ride upon the low dwell of the cam at which time all of its cooperating elements have been restored to normal position.

*Locking and unlocking cam mechanism*

Referring to Figs. 1, 5, 8, 9, 10 and 11, the mechanism for moving pawls 168 and 180 into and out of locking engagement with the master gear 123 and lock gear 178 is under control of the locking and unlocking cam 196, and includes a roller 220 adapted to ride upon the periphery of said cam. The roller 220 is mounted for rotation upon the forward end of an arm 221 pivoted upon the shaft 205. The arm 221 is resiliently urged in a counter-clockwise direction by means of a spring 222 having one end bearing against the inner side of bracket 207 and the other end bearing against a pin 223 fixed to the arm 221. An upwardly extending toe 224 formed on the arm 221 is adapted to cooperate with the cross bar 212 in a manner to limit the counter-clockwise movement of said arm 221. Pivotally mounted upon the shaft 205 is a U-shaped arm 225 which is resiliently connected to the arm 221 by means of a spring 226 having one end connected to a pin 227 on the arm 225 and the other end connected to the pin 223. The U-shaped arm 225 extends upwardly and is connected at 228 to a forwardly extending link 230 which link is connected at 231 to a depending arm 232 fast on a cross shaft 233. The cross shaft 233 is journaled at its ends in left and right hand brackets 234, (one shown), see Fig. 1, secured to the outer sides of the left and right hand walls of the frame 17 and has secured thereon a forwardly extending arm 235. The arm 235 is connected at 236 to the lower end of a vertical link 237, the upper end of which link is connected at 238 to an arm 240 secured to the shaft 179 previously described in connection with the locking and unlocking pawls 168 and 180. The above construction is such that, normally the roller 220 rides upon the low dwell of the cam 196 whereby, through the linkages just described, the shafts 179 and 233 are in their full clockwise position. In this position of the above mechanism, (see Fig. 8), the pawl 168 is in locking engagement with the master gear 123 so as to prevent any accidental rotation of said gear during the time that the machine is idle or during the time that the machine operates for alphabet printing. Also, at this time, the pawl 180 is out of locking engagement with the lock gear 178 (see Fig. 10).

Referring particularly to Figs. 8, 9, 10, 11, and 15, when the cam unit 104 is clutched to the continuously rotating power shaft 102 as above described, the cam unit including the locking and unlocking cam 196 is rotated in a counter-clockwise direction. Immediately upon the beginning of the rotation of the cam 196, the roller 220 cooperating therewith begins to rise from the low dwell of the cam to rock its arm 221 in a clockwise direction against tension of its spring 222. This causes the arm 225, through the now tensioned spring 226, to rock clockwise about its shaft 205 thereby rocking the arm 232 and consequently the shaft 233 in a counter-clockwise direction. Upon thus rocking the shaft 233 the arm 235 fixed thereto moves in a downward direction whereby, through link 237, the arm 240 and consequently the shaft 179 is rocked in a counter-clockwise direction. As has been previously described, rocking of the shaft 179 in a counter-clockwise direction causes a corresponding clockwise rotation of the shaft 174 whereby the pin 172 on the arm 173, cooperating with the cam slot 171 on the pawl 168, acts to rock the pawl 168 about its pivot 170 out of locking engagement with the master gear 123. Similarly, counter-clockwise rotation of the shaft 179 will cause a corresponding clockwise rotation of the shaft 185 whereby the pin 183 on the arm 184, cooperating with the cam slot 182 on the pawl 180, acts to rock the pawl 180 about its pivot 181 into locking engagement with the lock gear 178. At about 60° rotation of the cam 196, the roller 220 begins to ride upon the high dwell of the cam at which time the shafts 179 and 233 through their associated linkages above described are at their fully counter-clockwise position wherein the pawl 168 (see Fig. 9) is rocked fully out of locking engagement with the master gear 123 and the pawl 180 (see Fig. 11) is rocked fully into locking engagement with the lock gear 178. It will be recalled that, when the pawls 168 and 180 assume the above positions an amount may be entered into the accumulator additively or subtractively, as has been previously described. At about 175° rotation of the cam 96 the roller 220 begins to ride off the high dwell of the cam whereby shafts 179 and 233 through their associated mechanisms above described begin to rock in a clockwise direction to normal position. Clockwise rotation of the shaft 179 causes the shaft 174 to rock in a counter-clockwise direction whereby the pin 172 on the arm 173 cooperating with the cam slot 171 in the pawl 168 rocks said pawl into locking engagement with the master gear 123. Similarly, clockwise rotation of the shaft 179 causes counter-clockwise rotation of the shaft 185 whereby pin 183 on the arm 184 cooperating with cam slot 182 on the pawl 180 rocks said pawl out of locking engagement with the lock gear 178. At about 235° rotation of the cam 196 the shafts 179 and 233 are at their full clockwise position and the pawls 168 and 180 are fully restored to normal position wherein the pawl 168 is in locking engagement with the master gear 123 and the pawl 180 is out of locking engagement with the lock gear 178. It will be recalled that with the pawls 168 and 180 in the above position, the planetary gears 142 and the sun gear 141 are restored to normal position without effecting rotation of the master gear 123.

*Entering or add cam mechanism*

It has been previously described that downward movement of the links 152 and 154 causes the epicyclic gear train to actuate the master gear 123 in a manner to enter items either additively or subtractively in the accumulator, an amount corresponding to the numeral key depressed, and the upward movement of the links 152 and 154 acts to restore the epicyclic gear train to normal position without effecting rotation of the master gear 123.

Referring to Figs. 1, 5, 7 and 15, the mechanism for vertically moving the links 152 and 154 is under control of the entering or adding cam 197 and includes a roller 245 adapted to ride upon the periphery of said cam. The roller 245 is rotatably mounted upon an arm 246 pivotally mounted upon the shaft 205. The arm 246 is resiliently urged in a counter-clockwise direction by means of a spring 247 one end of which bears against the bracket 207 and the other end of which bears against a pin 248 fixed to the arm 246. An upwardly extending toe 250 formed on the arm 246 cooperates with the cross bar 212 in a manner to limit the counter-clockwise rotation of said arm. Pivotally mounted upon the shaft 205 is a U-shaped arm 251 which is resiliently connected to the arm 246 by means of a spring 252, one end of which is connected to the pin 248 and the other end of which is connected to a pin 253 on the arm 251. The upper end of the arm 251 is connected at 254 to the rear end of a link 255 the forward end of which is connected at 256 to a depending arm 257 secured to a cross shaft 258. The cross shaft 258 is journaled at its ends in brackets 234 (one shown), see Fig. 1, and has secured thereto a forwardly extending arm 260 connected at 159 to the aforementioned links 152 and 154. The above construction is such that normally the roller 245 on the lever 246 rides upon the low dwell of the cam 197 whereby the arm 260 and consequently the links 152 and 154 are in their fully raised position.

Referring particularly to Figs. 7 and 15, at about 60° rotation of the cam 197, the roller 245 cooperating therewith begins to rise from the low dwell of the cam whereby through its associated linkage above described the shaft 258 and arm 260 are rocked in a counter-clockwise direction. This causes lowering of the links 152 and 154 and clockwise rotation of the arm 144 to effect an entry in the manner previously described. At about 175° rotation of the cam 197, the shaft 258 and arm 260 are in their fully counter-clockwise position and consequently the links 152 and 154 are in their fully lowered position at which time the entering operation has been completed. At about 235° rotation of the cam 197 the roller 245 begins to ride off the high dwell of the cam 197 whereby the shaft 258 and arm 260 begin to rock in a clockwise direction and consequently the arms 152 and 154 begin to rise. It will be recalled that during this upward movement of the links 152 and 154 the master gear 123 is locked against rotation and the lock gear 178 is unlocked whereby the planetary gears 142 and the sun gear 141 are restored to normal position without effecting rotation of the master gear 123. At about 285° rotation of the cam 197 the roller 245 begins to ride upon the low dwell of the cam whereby the links 152 and 154 and their associated mechanism are fully restored to normal position. It will be noted that the arms 221 and 246 associated with the locking and unlocking mechanism and the entering or add mechanism respectively are each provided with a further toe or extension 261 which with their associated arms 225 and 251 fit within a slotted portion 262 (see Figs. 1 and 5) formed in the comb plate 91 so as to prevent any lateral displacement of said arms.

*Restoring cam mechanism*

It will be recalled that upon operation of any numeral key 20 (see Fig. 1) its associated slide 32 is released whereby said slide moves forwardly to bring its associated depending arms 163 and block 162 in cooperative relation with its associated differential arm 161. Forward movement of the slide 32 will, through stud 70, rock the four arm lever 72 to initiate the operation of the printing mechanism and clutch the cam unit 184 with the continuously operating power shaft 182. It will be seen that as long as the slide 32 is in its full forward position, the machine will function in continuous cycles. Means are therefore provided herein whereby the slide 32 is restored to its normal rearward position toward the end of each cycle of the machine so as to restore and bring to normal resting position its associated mechanisms.

Referring to Figs. 1, 5, 13 and 15, the means for restoring the slide 32 includes a cam 198 upon the periphery of which rides a roller 265 rotatably mounted upon an arm 266 pivotally mounted upon the shaft 95. The forward end of the arm 266 is forked at 267 to receive a pin 268 mounted upon a rearwardly extending arm 270 which arm is secured to a cross shaft 271. The shaft 271 is journaled at its ends in left and right hand brackets 272 (one shown), Fig. 1, secured to the inner sides of the left and right hand walls of the power base frame 10 and has secured thereto a pair of upright arms 273 connected at their upper ends by a cross bail 274. Each of the arms 273 have connected thereto one end of a spring 275, the other end of which spring is connected to the plate 36. The springs 275 serve to urge the shaft 271 in a counter-clockwise direction and consequently the roller 265 on arm 266 against the periphery of cam 198. Upon rotation of the cam 198 the cross bail 274 is adapted to first move rearwardly to restore all slides 32 to their normal position and subsequently move forwardly to permit forward movement of the slides 32 during the next entering operation of the machine.

It will be recalled that the slides 32 are retained in their rearward or normal position against the tension of springs 44 by means of the previously described pin 31 engaging the shoulder 30 (see Fig. 1). In order to insure the restoration of the previously actuated slide 32 to its latched position, it is necessary to move said slide rearwardly a slight distance beyond its normal latched position so that the pin 31 may properly engage the shoulder 30 thus preventing recycling of the machine. To this end means are provided herein to enable the overthrow rearwardly of only the actuated slide 32 without effecting an overthrow of the remaining latched slides, which operation would necessitate a great deal of power to overcome the tension of the combined springs 44. Referring to Figs. 1 and 13, each of the slides 32 have pivoted on the stud 70 a lever 276 having a depending arm 277 adapted to be engaged by the bail 274 upon its rearward movement thereof. The lever 276 is further provided with a substantially horizontal arm 278 having a low and high step 280 and 281, respectively, adapted to be alternately engaged by an extrusion 282 formed on the upper edge of a slide 283. The slide 283 is adapted to slide along its associated horizontal slot 41 formed in the slide 32 and is provided with a depending arm 284 which cooperates with the bail 274 in a manner to be moved forwardly along the slot 41 when the restoring bail 274 moves forwardly to its normal position.

The above construction is such that normally, i. e., when the restoring bail 274 is at its full forward position, all of the slides 32 are at their rearward latched position and the extrusions 282 of the slides 283 are in contact with their associated low steps 280 as shown in Fig. 13. With the parts in the above position, the bail 274 may be moved rearwardly a full distance without effecting any rearward movement of the slides 32 through their associated arms 277 on levers 276. Upon operation of a numeral key 20 its corresponding slide 32 moves forwardly, as above described, moving with it the lever 276 (see also Fig. 16). As the forward movement of slide 283 is limited by the casting 34, the lever 276, moving forwardly with the slide 32, is rocked in a clockwise direction by the extrusion 282 until said extrusion contacts the high step 281 of the arm 278. In this position of the parts (see Fig. 16) the lever 276 is in its full clockwise position and the arm 277 is moved forward a distance beyond that of the arms 277 whose associated low steps 280 contact the extrusions 282. It will be seen that when the restoring bail 274 moves rearwardly to restore the actuated slide 32 it will engage the arm 277 and, due to the binding action caused by the engagement of the extrusion 282 and the high step 281 will move the lever 276 and the slides 32 and 283 rearwardly a distance beyond the normal latched position of the other slides 32 without effecting movement of said other slides (see Fig. 17). At this time the pin 31 of the affected slide will assume a position slightly beyond the shoulder 30. During the first portion of the return movement of the bail 274 the slide 32, which was overthrown as above described, is permitted to move forwardly a slight distance until its pin 31 engages the shoulder 30. At the same time, the bail 274 picks up the depending arm 284 of the slide 283 and moves said slide forwardly along the slot 41 to its normal position wherein its extrusion again engages the low step 280.

Referring particularly to Figs. 13 and 15, the timing for moving the bail 274 rearwardly to restore the actuated slide 32 to its latched position and forwardly to normal position is such that at about 3° rotation of the cam 198 the roller 265 has completed its movement from the high dwell to the low dwell of the cam during which time the bail 274 is moved forwardly a slight distance. At about 279° rotation of the cam 198 the roller 265 begins to rise from the low dwell of the cam to rock the arm 266 in a counter-clockwise direction and consequently the shaft 271 in a clockwise direction. This causes rearward movement of the bail 274 to engage the depending arm 277 associated with the previously released slide and move said arm and slide rearwardly. At about 325° rotation of the cam 198 the roller 265 begins to ride upon the high dwell of the cam at which time the bail 274 has fully reached its rearward position and the slide has been moved a distance beyond its normal latched position. At about 336° rotation of the cam 198, the roller 265 begins to ride off the high dwell of the cam and the bail 274 begins to move forwardly to its normal position. It will be noted that shortly after the bail 274 begins its forward movement the previously released slide 32 above referred to moves forwardly to its latched position. At the end of the machine cycle the resting portion of the roller 265 is about 3° from the low dwell of the cam 198 to insure the disengagement of the dogs 100 and clutch member 101.

Summary of operations

In order to set forth the sequence of the various functions of the present machine, the following is an illustrative example of the manner in which a numeral may be either entered into or subtracted from the accumulator. With the foregoing description of the invention in mind, let it be assumed that the machine is in its normal cleared position and it is desired to enter the numeral "7" additively into the accumulator. The credit balance reversing mechanism is set in the manner set forth in the above mentioned Wahl patent to engage one of the gears 125 with the internal gear 145 (see Figs. 1, 2, and 8) so that clockwise rotation of said gear 145 will cause a corresponding rotation of the master gear 123 in an add direction. With the machine conditioned as above, the "7" numeral key 20 is depressed, which as above described releases its associated slide 32 to cause said slide to move forwardly under the influence of its spring 44. Immediately upon the release of the slide 32 the cam portion 57 thereon cooperating with the pin 58 causes actuation of the key lock mechanism to prevent operation of a second numeral key 20. At the same time the slot 166 of the slide 32 picks up its associated stud 165 to rock its associated depending arms 163 clockwise about the shaft 164 to a position whereby the stop block 162 is brought directly in vertical alignment with and into the path of movement of its associated differential arm 161. Shortly after the release of the slide 32 the stud 70 thereon engages the arm 71 of lever 72 to rock the lever clockwise to cause engagement of the snatch pawl 15 with the snatch roll 16 to print the numeral "7" and also to cause rearward movement of the bail 83 and link 85 thereby connecting the cam unit 104 with the continuously rotating shaft 102. When the cam unit 104 is thus connected with the shaft 102 the spacing cam 195, the add cam 197, the lock cam 196 and the restoring cam 198 will make one complete revolution to actuate their associated mechanism whereby the machine may perform the various functions as above described. The first of the above functions performed by the machine upon connecting the cam unit 104 with the shaft 102 is that of enabling cam 196 to actuate the locking pawls 168 and 180 in a manner to unlock the master gear 123 and lock sun gear 141 in preparation for making an entry into the accumulator. The second of the above functions takes place shortly after the master wheel 123 is fully unlocked and the sun gear 141 is fully locked at which time the cam 197 is effective to lower the links 152 and 154 to rotate the internal gear 145 which through the gears 125 rotates the master gear 123 in the add direction. The links 152 and 154 move downwardly until the differential arm 161 limits against its associated stop block 162, the downward movement in this instance being such that the master gear 123 is rotated a distance sufficient to enter only "7" in the accumulator. The third of the above functions takes place shortly after the entry of "7" has been made in the accumulator at which time the spacing cam 195 is effective to initiate a spacing operation of the machine. The 4th and last of the above functions takes place toward the end of the machine cycle and after the above cams 195, 196, and 197 have restored their associated mechanisms to normal position at which time the restoring cam 198 is effective to actuate the restoring bail 274 to restore the actuated slide and its associated mechanism back to normal position. It will be noted that all of the above functions initiated upon the depression of a numeral key take place substantially in one complete cycle of the machine. In a similar manner it will be seen that upon depression of any one of the numeral keys 20 the number corresponding to the numeral key depressed may be entered in the accumulator additively. Should it be desired to enter an amount in the accumulator negatively, it is merely necessary to set the credit balance reversing mechanism in a manner to disengage the gears 125 from the internal gear 145 and engage the pinion 127 with the internal gear 145 so that clockwise rotation of said gear 145 as above described will cause a corresponding rotation of the master gear 123 in a subtract direction.

While we have described what we consider to be a highly desirable embodiment of our invention, it is obvious that many changes in form could be made without departing from the spirit of our invention, and we, therefore, do not limit ourselves to the exact form herein shown and described, nor to anything less than the whole of our invention as hereinbefore set forth and as hereinafter claimed.

What we claim as new and desire to secure by Letters Patent is:

1. In a machine of the class described, numeral keys, a snatch roll printing mechanism, a continuously rotating power shaft, a control unit normally disconnected from but associated with the power shaft, a master wheel, an epicyclic gear train normally in continuous driving connection with the master wheel, connections extending from the control unit for driving the gear train, and means operable upon depression of any of said numeral keys for connecting the control unit with the power shaft and initiating the operation of the snatch roll printing mechanism.

2. In a machine of the class described, numeral keys, a snatch roll printing mechanism, a continuously rotating power shaft, a control unit normally disconnected from but associated with the power shaft, a master wheel, an epicyclic gear train normally in continuous driving connection with the master wheel, connections extending from the control unit for driving the gear train, and a slide mechanism operable upon depression of any of said numeral keys for connecting the control unit with the power shaft and initiating the operation of the snatch roll printing mechanism.

3. In a machine of the class described, numeral keys, a continuously rotating power shaft, a control unit normally disconnected from but associated with the power shaft, a master wheel, an annular epicyclic gear train normally in continuous driving connection with the master wheel, connections extending from the control unit for locking and unlocking the master wheel and for concurrently unlocking and locking parts of the gear train, means also extending from the control unit for driving the gear train around its axis, and means operable upon depression of any of said numeral keys for connecting the control unit with the power shaft.

4. In a machine of the class described, numeral keys, a continuously rotating power shaft, a control unit normally disconnected from but associated with the power shaft, a master wheel, an epicyclic gear train normally in continuous driving connection with the master wheel, connections extending from the control unit for locking and unlocking the master wheel and for concurrently unlocking and locking parts of the gear train, connections also extending from the control unit for driving the gear train around its axis, and a slide mechanism operable upon depression of any of said numeral keys for connecting the control unit with the power shaft.

5. In a machine of the class described, numeral keys, a continuously rotating power shaft, a control unit normally disconnected from but associated with the power shaft, a master wheel, an epicyclic gear train normally in continuous driving connection with the master wheel, connections extending from the control unit for locking and unlocking the master wheel and for concurrently unlocking and locking parts of the gear train, connections also extending from the control unit for driving the gear train around its axis, means associated with the numeral keys for limiting the movement of said driving connections, and means operable upon depression of any of said numeral keys for connecting the control unit with the power shaft.

6. In a machine of the class described, numeral keys, a snatch roll printing mechanism, a continuously rotating power shaft, a control unit normally disconnected from but associated with the power shaft, a master wheel, an annular epicyclic gear train comprising an internal gear, planetary gears, and a sun gear, the said internal gear normally in continuous driving connection with the master wheel, connections extending from the control unit for locking and unlocking the master wheel alternately with the sun gear, connections also extending from the control unit for driving the gear train, and means operable upon depression of any of said numeral keys for connecting the control unit with the power shaft and initiating the operation of the snatch roll printing mechanism.

7. In a machine of the class described, numeral keys, a snatch roll printing mechanism, a continuously rotating powershaft, a control unit normally disconnected from but associated with the power shaft, a master wheel, an epicyclic gear train comprising an internal gear, planetary gears and a sun gear, the said internal gear normally in continuous driving connection with the master wheel, connections extending from the control unit for locking and unlocking the master wheel alternately with the sun gear, connections also extending from the control unit for driving the gear train, and a slide mechanism operable upon depression of any of said numeral keys for connecting the control unit with the power shaft and initiating the operation of the snatch roll printing mechanism.

8. In a machine of the class described, numeral keys, a continuously rotating power shaft, a control unit normally disconnected from but associated with the power shaft, a master wheel, an epicyclic gear train comprising an internal gear, planetary gears, and a sun gear, the said internal gear normally in continuous driving connection with the master wheel, connections extending from the control unit for locking and unlocking the master wheel, connections also extending from the control unit to the planetary gears for driving the gear train when the master wheel is unlocked, and means operable upon depression of any of said numeral keys for connecting the control unit with the power shaft.

9. In a machine of the class described, numeral keys, a continuously rotating power shaft, a control unit normally disconnected from but associated with the power shaft, a master wheel, an annular epicyclic gear train comprising an internal gear, planetary gears, and a sun gear, the said internal gear normally in continuous driving connection with the master wheel, connections extending from the control unit for locking and unlocking the master wheel, connections also extending from the control unit to the planetary gears for driving the gear train when the master wheel is unlocked, and a slide mechanism operable under depression of any of said numeral keys for connecting the control unit with the power shaft.

10. In a machine of the class described, numeral keys, a snatch roll printing mechanism a continuously rotating power shaft, a control unit normally disconnected from but associated with the power shaft, a master wheel, an epicyclic gear train comprising an internal gear, planetary gears, and a sun gear, the said internal gear normally in continuous driving connection with the master wheel, connections extending from the control unit to the planetary gears for driving the gear train, and means operable upon depression of any of said numeral keys for connecting the control unit with the power shaft and initiating the operation of the snatch roll printing mechanism.

11. In a machine of the class described, numeral keys, a snatch roll printing mechanism a continuously rotating power shaft, a control unit normally disconnected from but associated with the power shaft, a master wheel, an annular epicyclic gear train comprising an internal gear, planetary gears, and a sun gear, the said internal gear normally in continuous driving connection with the master wheel, connections extending from the control unit to the planetary gears for driving the gear train, and a slide mechanism operable upon depression of any of said numeral keys for connecting the control unit with the power shaft and initiating the operation of the snatch roll printing mechanism.

12. In a machine of the class described, numeral keys, a snatch roll printing mechanism a continuously rotating power shaft, a control unit normally disconnected from but associated with the power shaft, a master wheel, an epicyclic gear train normally in continuous driving connection with the master wheel, connections extending from the control unit for driving the gear train, means associated with the numeral keys for limiting the movement of said driving connections, and a slide mechanism operable upon depression of any of said numeral keys for connecting the control unit with the power shaft and initiating the operation of the snatch roll printing mechanism.

13. In a machine of the class described, numeral keys, a continuously rotating power shaft, a control unit normally disconnected from but associated with the power shaft, a master wheel, an annular epicyclic gear train comprising an internal gear, planetary gears and a sun gear, the said internal gear normally in continuous driving connection with the master wheel, connections extending from the control unit for locking and unlocking the master wheel alternately with the sun gear, connections also extending from the control unit for driving the gear train when the sun gear is locked, and means operable upon depression of any of said numeral keys for connecting the control unit with the power shaft.

14. In a machine of the class described, numeral keys, a continuously rotating power shaft, a control unit normally disconnected from but associated with the power shaft, a master wheel, an annular epicyclic gear train comprising an internal gear, planetary gears and a sun gear, the said internal gear normally in continuous driving connection with the master wheel, connections extending from the control unit for locking and unlocking the master wheel alternately with the sun gear, connections also extending from the control unit for driving the gear train when the sun gear is locked, and a slide mechanism operable upon depression of any of said numeral keys for connecting the control unit with the power shaft.

15. In a machine of the class described, numeral keys, a snatch roll printing mechanism, a continuously rotating power shaft, a control unit normally disconnected from but associated with the power shaft, a master wheel, an annular epicyclic gear train comprising an internal gear, planetary gears and a sun gear, the said internal gear normally in continuous driving connection with the master wheel, connections extending from the control unit for locking and unlocking the master wheel alternately with the sun gear, connections also extending from the control unit for driving the gear train when the master wheel is unlocked and for restoring the driving means when the sun gear is unlocked, and means operable upon depression of any of said numeral keys for connecting the control unit with the power shaft and initiating the operation of the snatch roll printing mechanism.

16. In a machine of the class described, numeral keys, a snatch roll printing mechanism, a continuously rotating power shaft, a control unit normally disconnected from but associated with the power shaft, a master wheel, an annular epicyclic gear train comprising an internal gear, planetary gears and a sun gear, the said internal gear normally in continuous driving connection with the master wheel, a pawl for locking and unlocking the master wheel, a pawl for locking and unlocking the sun gear, connections extending from a cam on the control unit for alternately locking and unlocking the pawls, connections extending from another cam on the control unit to the planetary gears for driving the gear train when the master wheel is unlocked and for restoring the planetary gears when the sun gear is unlocked, and a slide mechanism operable upon depression of any of said numeral keys for connecting the control unit with the power shaft and initiating the operation of the snatch roll printing mechanism.

17. In a machine of the class described, a numeral key, a master wheel, a continuously rotating power shaft, an annular epicyclic gear train comprising a sun gear, a planet gear, and an internal gear, the internal gear normally in continuous driving connection with the master wheel, a cam unit normally disconnected from but associated with the power shaft, a pawl for locking and unlocking the master wheel, a pawl for locking and unlocking the sun gear, connections extending respectively between one of the cams in the unit and the pawls and between another of the cams in the unit and the planet gear, the connections adapted to engage the pawl with the sun gear when the master wheel pawl is disengaged and vice versa as well as to drive the planet gear, and means actuated by the operation of the key and associated with the cam unit to connect the cam unit with the power shaft.

18. In a machine of the class described, a numeral key, a master wheel, a continuously rotating power shaft, an annular epicyclic gear train comprising a sun gear, a planet gear, and an internal gear, the internal gear normally in continuous driving connection with the master wheel, a cam unit normally disconnected from but associated with the power shaft, a pawl for locking and unlocking the master wheel, a pawl for locking and unlocking the sun gear, connections extending respectively between one of the cams in the unit and the pawls and between another of the cams in the unit and the planet gear, the connections adapted to engage the pawl with the sun gear when the master wheel pawl is disengaged and vice versa as well as to drive the planet gear, a slide actuated by the operation of the key, and means operated by the movement of the slide and associated with the cam unit to connect the cam unit with the power shaft.

19. In a machine of the class described, numeral keys, a continuously rotating power shaft, a cam unit normally disconnected from but associated with the power shaft, a master wheel, an annular epicyclic gear train comprising an internal gear, planetary gears and a sun gear, the said internal gear normally in continuous driving connection with the master wheel, a pawl for locking and unlocking the master wheel, a pawl for locking and unlocking the sun gear, connections extending from a cam in the cam unit for alternately locking and unlocking the pawls, connections extending from another cam in the cam unit to the planetary gears for driving the gear train when the master wheel is unlocked and for restoring the planetary gears when the sun gear is unlocked, a slide mechanism operable upon depression of any of said numeral keys for connecting the control unit with the power shaft.

20. In a machine of the class described, numeral keys, a snatch roll printing mechanism a continuously rotating power shaft, a control unit normally disconnected from but associated with the power shaft, a master wheel, an annular epicyclic gear train comprising an internal gear, planetary gears, and a sun gear, the said internal gear normally in continuous driving connection with the master wheel, connections extending from a cam in the control unit for alternately locking and unlocking the master wheel and sun gear, the sun gear forming a fixed axis for the gear train when the master wheel is unlocked and an idle axis when the master wheel is locked, connections extending from another cam in the control unit to the planetary gears for driving the gear train when the sun gear is fixed and for restoring the planetary gears when the sun gear is idle, and a slide mechanism operable upon depression of any of said numeral keys for connecting the control unit with the power shaft and initiating the operation of the snatch roll printing mechanism.

21. In a machine of the class described, numeral keys, a continuously rotating power shaft, a control unit normally disconnected from but associated with the power shaft, a master wheel, an epicyclic gear train normally in continuous driving connection with the master wheel, connections extending from a cam in the control unit for locking and unlocking the master wheel and for concurrently unlocking and locking parts of the gear train, connections extending from another cam in the control unit to the planetary gears for driving the gear train around its axis, differential elements associated with the driving connections, blocking means for limiting the movement of said driving connections, and a slide mechanism operable upon depression of any of said numeral keys for connecting the control unit with the power shaft and for moving the blocking means into the path of the said driving connections.

22. In a machine of the class described, numeral keys, a snatch roll printing mechanism, a continuously rotating power shaft, a control unit normally disconnected from but associated with the power shaft, a master wheel, an epicyclic gear train normally in continuous driving connection with the master wheel, connections extending from the control unit for locking and unlocking the master wheel, the said connections also operable for fixing the axis of the gear train when the master wheel is unlocked and vice versa, connections also extending from the control unit for driving the gear train around the fixed axis, and a slide mechanism operable upon depression of any of said numeral keys for connecting the control unit with the power shaft and initiating the operation of the snatch roll printing mechanism.

23. In a machine of the class described, numeral keys, a snatch roll printing mechanism, a continuously rotating power shaft, a control unit normally disconnected from but associated with the power shaft, a master wheel, an annular epicyclic gear train comprising an internal gear, planetary gears, and a sun gear, the said internal gear normally in continuous driving connection with the master wheel, a pawl operable to lock and unlock the master wheel, a pawl operable to lock and unlock the sun gear, connections extending from the control unit for effecting operation of said pawls to alternately lock and unlock said sun gear and master wheel, connections also extending from the control unit to the planetary gears for driving the gear train when the master wheel is unlocked and for restoring the planetary gears when the sun gear is unlocked, differential elements movable with the driving connections, blocking means for limiting the movement of said differential elements, and a slide mechanism operable upon depression of any of said numeral keys for effecting the connection of the control unit with the power shaft, the moving of the blocking means into effective position, and the actuating of the snatch roll printing mechanism.

24. In a machine of the class described, numeral keys, a snatch roll printing mechanism, a continuously rotating power shaft, a control unit normally disconnected from but associated with the power shaft, a master wheel, an annular epicyclic gear train comprising an internal gear, planetary gears, and a sun gear, the said internal gear normally in continuous driving connection with the master wheel, connections extending from the control unit for locking and unlocking the master wheel, the said connections also operable for fixing the axis of the gear train when the master wheel is unlocked and vice versa, connections also extending from the control unit to the planetary gears for driving the gear train around the fixed axis, differential elements movable with the driving connections, blocking means for limiting the movement of said differential elements, and a slide mechanism operable upon depression of any of said numeral keys for moving the blocking means into effective position, connecting the control unit with the power shaft, and initiating the operation of the snatch roll printing mechanism.

25. In a machine of the class described, numeral keys, a snatch roll printing mechanism, a continuously rotating power shaft, a control unit normally disconnected from but associated with the power shaft, a master wheel, an annular epicyclic gear train comprising an internal gear, planetary gears, and a sun gear, the said internal gear normally in continuous driving connection with the master wheel, connections extending from the control unit for alternately locking and unlocking the master wheel and sun gear, the sun gear forming a fixed axis for the gear train when the master wheel is unlocked and an idle axis when the master wheel is locked, connections also extending from the control unit to the planetary gears for driving the gear train when the sun gear is fixed and for restoring the planetary gears when the sun gear is idle, differential elements movable with the driving connections, blocking means for limiting the movement of said differential elements and a slide mechanism operable upon depression of any of said numeral keys for moving the blocking means into effective position, connecting the control unit with the power shaft and initiating the snatch roll printing mechanism.

26. In a machine of the class described, numeral keys, a snatch roll printing mechanism, a continuously rotating power shaft, a control unit normally disconnected from but associated with the power shaft, a master wheel, an epicyclic gear train comprising an internal gear, planetary gears, and a sun gear, the said internal gear normally in continuous driving connection with the master wheel, connections extending from the control unit for alternately locking and unlocking the master wheel and sun gear, the planetary and internal gears turning about the sun gear when the master wheel is unlocked and the sun and planetary gears turning within the internal gear when the master wheel is locked, connections also extending from the control unit to the planetary gears for driving the gear train around the fixed sun gear, and a slide mechanism operable upon depression of any of said numeral keys for connecting the control unit with the power shaft and initiating the operation of the snatch roll printing mechanism.

EDWIN O. ROGGENSTEIN.
EMIL F. THIERFELDER.

REFERENCES CITED

The following references are of record in the file of this patent:

UNITED STATES PATENTS

| Number    | Name     | Date          |
|-----------|----------|---------------|
| 1,204,755 | Goldberg | Nov. 14, 1916 |
| 1,246,889 | Degener  | Nov. 20, 1917 |
| 2,253,748 | Avery    | Aug. 26, 1941 |
| 2,369,574 | Kammel   | Feb. 13, 1945 |